(12) United States Patent
Ferrucci et al.

(10) Patent No.: US 11,797,610 B1
(45) Date of Patent: Oct. 24, 2023

(54) KNOWLEDGE ACQUISITION TOOL

(71) Applicant: Elemental OpCo, LLC, Wilton, CT (US)

(72) Inventors: David Ferrucci, Wilton, CT (US); Clifton James McFate, Norwalk, CT (US); Aditya Kalyanpur, Fort Lee, NJ (US); Andrea Bradshaw, New York, NY (US); David Melville, Boiceville, NY (US)

(73) Assignee: Elemental Cognition Inc., New York, NY (US)

( * ) Notice: Subject to any disclaimer, the term of this patent is extended or adjusted under 35 U.S.C. 154(b) by 454 days.

(21) Appl. No.: 17/021,999

(22) Filed: Sep. 15, 2020

(51) Int. Cl.
*G06F 40/205* (2020.01)
*G06F 40/30* (2020.01)
*G06F 16/9032* (2019.01)
*G06F 40/35* (2020.01)
*G06N 5/022* (2023.01)

(52) U.S. Cl.
CPC ........ *G06F 16/90332* (2019.01); *G06F 40/35* (2020.01); *G06N 5/022* (2013.01)

(58) Field of Classification Search
CPC .... G06F 40/30; G06F 40/211; G06F 16/3329; G06F 40/216; G06F 40/295; G06F 40/166; G06F 16/3344; G06F 40/289; G06F 16/243; G06F 16/24522; G10L 15/1822; G10L 15/26; G10L 15/16; G06N 3/08; G06N 20/00; G06N 3/045; G06N 3/044
See application file for complete search history.

(56) References Cited

U.S. PATENT DOCUMENTS

| | | | | |
|---|---|---|---|---|
| 6,598,018 B1* | 7/2003 | Junqua | .................... | G10L 15/22 704/E15.04 |
| 7,599,952 B2* | 10/2009 | Parkinson | ............. | G06F 40/216 707/999.102 |
| 10,529,326 B2* | 1/2020 | Landry | .................... | G06F 3/167 |
| 10,594,757 B1* | 3/2020 | Shevchenko | ........... | G06F 40/35 |
| 11,538,468 B2* | 12/2022 | Teserra | .................... | G06F 40/30 |

(Continued)

OTHER PUBLICATIONS

Mostafazadeh ett al, "Glucose: Generalized and contextualized story explanations", Oct. 2020, arXiv preprint arXiv:2009.07758. Sep. 16, 2020, pp. 1-18.*

(Continued)

*Primary Examiner* — Olujimi A Adesanya
(74) *Attorney, Agent, or Firm* — Lee & Hayes, P.C.

(57) ABSTRACT

A natural language interfacing system may use a knowledge acquisition tool to obtain structured representations from user input text. The system may initiate interaction with a request for input and a partial statement with blank text slots labeled by field types. The system may receive input text to fill in a slot of the partial statement and perform semantic parsing on the input text to identify a trigger concept. The system may generate a list of templates defining different semantic frames for the trigger concept. A generated template may include additional generated slots and/or suggested slot-fillers to guide user input. In response to a template selection, the partial statement includes the trigger concept annotated with a semantic frame. This process is repeated by iteratively updating the list of templates until the statement is completed. The statement is mapped to a structured representation including semantic frames.

20 Claims, 8 Drawing Sheets

(56) References Cited

U.S. PATENT DOCUMENTS

| | | | | |
|---|---|---|---|---|
| 2005/0075859 | A1* | 4/2005 | Ramsey | G06F 40/30 |
| | | | | 704/9 |
| 2008/0140389 | A1* | 6/2008 | Funakoshi | G06F 40/30 |
| | | | | 704/9 |
| 2016/0239739 | A1* | 8/2016 | Das | G06F 40/58 |
| 2017/0249309 | A1* | 8/2017 | Sarikaya | G06F 16/24565 |
| 2017/0372199 | A1* | 12/2017 | Hakkani-Tur | G06N 3/08 |
| 2017/0372200 | A1* | 12/2017 | Chen | G06N 3/044 |
| 2018/0039614 | A1* | 2/2018 | Govindarajulu | G06F 40/211 |
| 2018/0060301 | A1* | 3/2018 | Li | G06N 3/08 |
| 2018/0101599 | A1* | 4/2018 | Arnold | G06F 16/338 |
| 2018/0233141 | A1* | 8/2018 | Solomon | G06V 40/23 |
| 2019/0244603 | A1* | 8/2019 | Angkititrakul | G10L 15/22 |
| 2019/0295537 | A1* | 9/2019 | Sapugay | G06F 40/205 |
| 2020/0410011 | A1* | 12/2020 | Shi | G06F 16/90332 |
| 2020/0410989 | A1* | 12/2020 | Ray | G06N 20/00 |

OTHER PUBLICATIONS

Kalyanpur et al, "Open-domain frame semantic parsing using transformers.", Oct. 2020, arXiv preprint arXiv:2010.10998. Oct. 21, 2020, pp. 1-11.*

Xiang et al, A survey of event extraction from text: Nov. 2019, IEEE Access. Nov. 29, 2019;7:173111-37.*

Swayamdiptaet al, "Frame-semantic parsing with softmax-margin segmental rnns and a syntactic scaffold", 2017, arXiv preprint arXiv:1706.09528. Jun. 29, 2017, pp. 1-12.*

Chenet al, "Unsupervised induction and filling of semantic slots for spoken dialogue systems using frame-semantic parsing", 2013, In2013 IEEE Workshop on Automatic Speech Recognition and Understanding Dec. 8, 2013 (pp. 120-125). IEEE.*

Chambers et al, "Template-based information extraction without the templates", 2011, InProceedings of the 49th annual meeting of the association for computational linguistics: human language technologies Jun. 2011 (pp. 976-986).*

\* cited by examiner

402

| ... | |
|---|---|
| If _____ then _____<br><antecedent>    <consequent> | ⓘ |
| Often when _____ then _____<br><antecedent>        <consequent> | ⓘ |
| Before _____ it is required that _____<br><antecedent>              <consequent> | ⓘ |

404

If <u>the child takes the cookie from the jar</u> then _____
                  <antecedent>                                      <consequent>

406 — REMOVE, TAKE

In "the child takes the cookie from the jar" did you mean <u>take</u> like <u>remove</u> as in:
an agent removes an object from a container.

*He removes the sandwich from his lunchbox.*

Score: 1.00

408 — CONSUME, TAKE

In "the child takes the cookie from the jar" did you mean <u>take</u> like <u>consume</u> as in:
an agent consumes a substance: food, drink, medicine, etc.

*The party-goers consumed the spread.*

Score: 0.88

410

If <u>the child</u> takes <u>the cookie</u> <u>from the jar</u> then _____
     <agent>       <object>    <container>     <consequent>

412 — COOKIE

By <u>cookie</u> I mean:
a small sweet cake, typically round and flat and having a crispy or chewy texture Score: 1.00

414 — COOKIE

By <u>cookie</u> I mean any <u>biscuit</u> more generally.
For example:
biscuit, hardtack, cookie, cracker, wafer Score: 1.00

FIG. 4

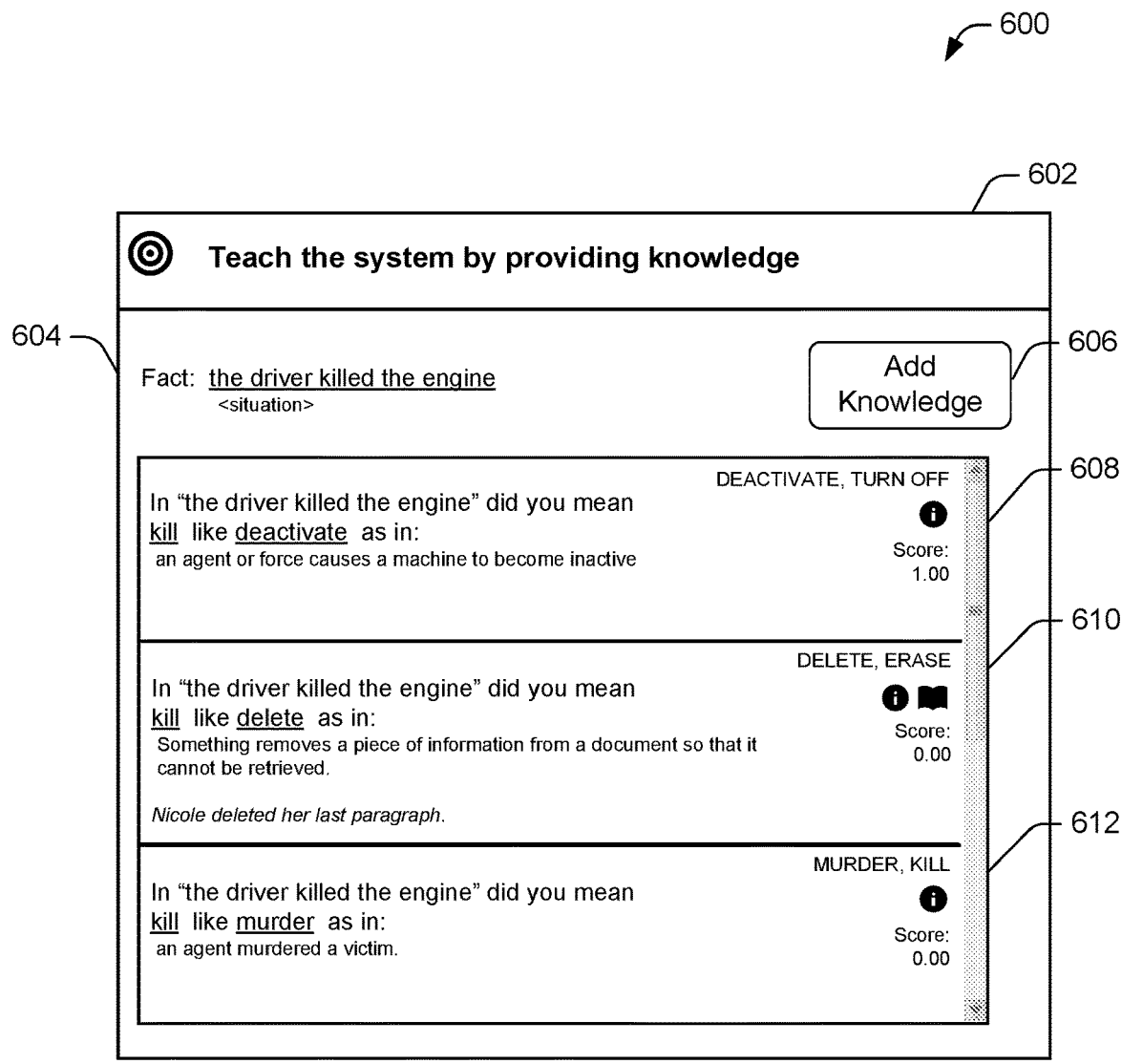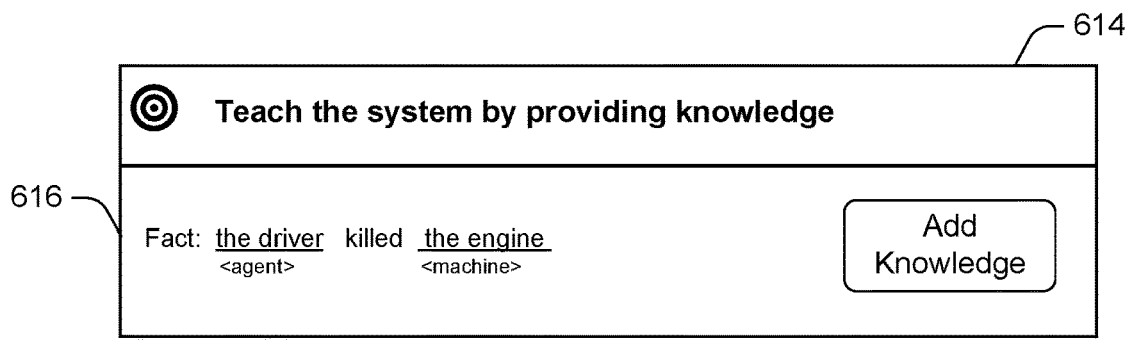
FIG. 6

KNOWLEDGE ACQUISITION TOOL

BACKGROUND

Computer applications that interact with users by natural language input typically rely on converting the user input sentences into structured knowledge representation(s) for the computer to understand. Natural language is a naturally evolved language developed by humans through use, which is distinguishable from constructed language that is a coded language developed by humans for the computers use. The constructed language uses a structured knowledge representation (a "structured representation") to capture information about the world in general or a sentence specifically. Because each word in a natural language sentence can have multiple meanings, the structured representation constructed to represent the sentence has to indicate the true meaning of the words in the sentence. Accordingly, the data space required to store the structured representation of the sentence can be exponentially greater than the data space needed to store the sentence string itself.

Additionally, to capture the true meaning of the words within a sentence, the computer needs to properly interpret a writer's intent. However, capturing the writer's intent remains a difficult task for the computer to solve. Moreover, a typical user of a computer application may be unfamiliar with structured representations and how natural language input is converted. Thus, this conversion process, which relies on a computer to interpret an untrained user's intent, may create a mismatch between what an application is capable of interpreting and what the typical user knows how to express.

To decrease this mismatch, various conversion tools may be used to map natural language input into a structured representation. The conversion tools may use methods including statistical or rule-based frame semantic parsing, fixed template selection logic, and/or manual entry of structured representation. Each of these methods has severe limitations. Existing conversion tools that perform semantic parsing on natural language text to arbitrary (non-fixed) structured representations produce noisy mappings (e.g., a structured representation that fails to capture the true meaning of the sentence). Furthermore, these tools fail to guide the user as the user is entering input text. Fixed template selection logic is not only difficult to create but it is also not reusable and doesn't scale as new templates are added. Manual entry of structured representations requires expert users, which fails to address the issue created by the typical untrained user. Accordingly, there is an ongoing need for a more intelligent natural language interfacing system that can, like natural language, naturally evolve and develop structured representations with humans through use.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 illustrates example user interfaces of the present disclosure for an example template generating flow.

FIG. 6 illustrates example user interfaces of the present disclosure for an example statement annotation based on template selection.

DETAILED DESCRIPTION

Figure 1:
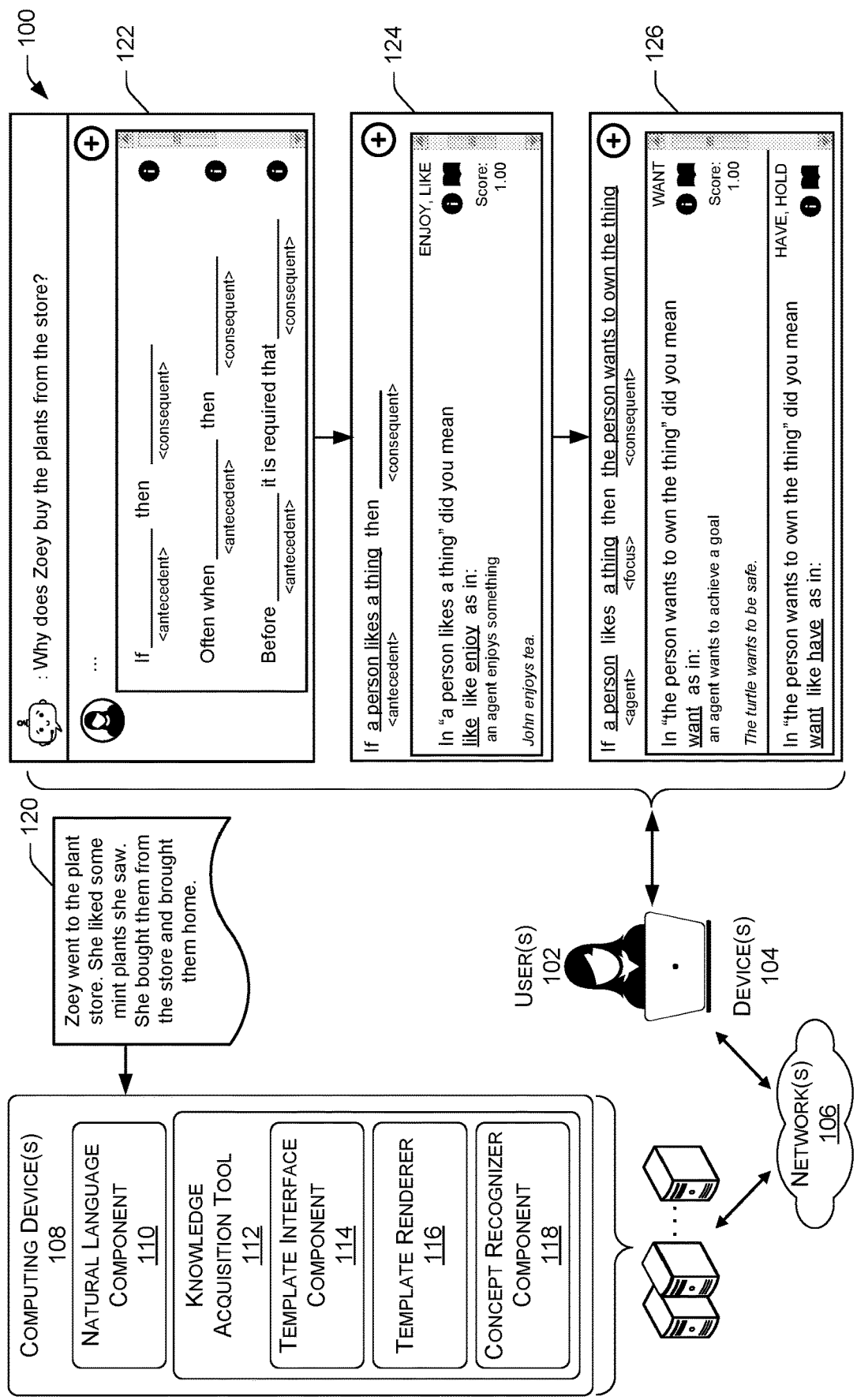
FIG. 1 illustrates an example system with a natural language interfacing system including a knowledge acquisition tool.

This disclosure is directed, in part, to a natural language interfacing system including a knowledge acquisition tool for obtaining structured representations from natural language text received by user input. The system may be a standalone application and/or may be an application programming interface (API) integrated within any computer application. As a standalone application, the system may perform various processes to train and improve various components and/or models of the system. As an API, the system may serve as an interfacing tool between a user and a downstream application. In any application setting, the system may serve as the conversion tool between natural language and constructed language, thus performing text-to-structure mapping and/or structure-to-text mapping, as needed. In some examples, based on a specific application setting, the system may use domain-specific data, including domain context, domain content, domain library, and/or domain templates, for the mappings. The system may designate a target representation language as the constructed language that the downstream application may use or convert for use. In examples, the target representation language may use semantic frame structures as the structured representations to capture the true meaning of a word in a sentence by encoding roles and arguments associated with the word to concepts, objects, scenes, events, and the like. The system may use the knowledge acquisition tool to perform text-to-structure mappings.

The knowledge acquisition tool may generate a user interface (UI) with various UI elements to interact with the user. The knowledge acquisition tool may generate a prompt to request knowledge from the user by user input. The user input may include input text or a selection of one of the UI elements. The UI elements may include selectable templates and icons associated with templates that may provide additional information (e.g., definitions, examples, etc.) about the associated templates. A selectable template may include blank text fields ("slots") labeled with field types to guide the user input.

In some examples, the knowledge acquisition tool may initiate interaction with the user by providing one or more base templates. A base template may express an incomplete statement and provide a partial semantic structure for the knowledge acquisition tool to construct the final structured representation. The base template may include one or more words based on a statement type and one or more slots that a user may fill in by input text to complete the statement. A statement and/or an associated base template may be labeled by any statement types that may be used by the knowledge acquisition tool for selecting a base template that is relevant to the current application and/or current prompt. The statement types may include broad categories (e.g., rules, facts, clauses, states, etc.), narrow categories (e.g., rule types, fact types, clause types, settings, states, scenarios), domain-specific categories, and the like.

The knowledge acquisition tool may select templates from a templates database to present in the list of base templates. In some examples, the list of base templates may be based on the statement type(s) that is relevant to the specific application setting and the list may be ordered based on the relevance. For instance, if the system is integrated with a natural learning application setting and the prompt is asking a question about a story, the list of base templates may include templates for the statement type of goal clause (e.g., if/then, often when/then, etc.). In another instance, if the system is integrated with a smart thermostat application setting and the prompt is asking the user to provide thermostat settings, the list of base templates may include a template for the statement type of conditional rule (e.g., if/then). Accordingly, in some examples, the list of base templates may include only one base template based on the knowledge requested by the specific application setting. In the example for the smart thermostat application setting, the system may also include domain templates for domain statement types for setting different thermostat rules including temporal rule, (e.g., if time is/then), master setting rule (e.g., if the thermostat is on, then set the minimum temperature), conditional override rule, and the like.

The knowledge acquisition tool may continuously guide user input by providing a list of updated templates. The list of updated templates may be generated by the knowledge acquisition tool based on a trigger concept ("trigger") detected in the user input. As the system receives input text through the UI, the knowledge acquisition tool may perform a semantic parsing process on the input text to identify the trigger concept. A trigger concept may include any word detected in the input text that may be associated with a particular lexical trigger and/or grammatical feature and may be determined based on the semantic parsing scheme (e.g., predicate-based, hierarchy-based, etc.). The knowledge acquisition tool may use a language model to generate a list of semantic templates with a statistical likelihood of expressing the user's intent for the trigger concept. The templates in the list of semantic templates may each provide a different semantic frame for the trigger concept. A semantic frame ("frame") may define a semantic role and/or a semantic argument for a word in a sentence. The knowledge acquisition tool may present the list of semantic templates for user selection. Based on the user selection of a particular semantic template, the knowledge acquisition tool may annotate the trigger concept with the particular semantic frame and this annotation may map the user's intent for the associated input text. The system may continuously parse input text and continuously generate updated templates. In some examples, a generated template may include additional generated slots to provide guidance for input text. In various examples, to provide additional guidance for input text, the system may use a statistical model to auto-complete any generated slots with suggested slot-filler text based on a statistical probability that the user may want to enter the suggested slot-filler text. The user may provide input selection to confirm the suggested slot-filler text or may provide input text for the generated slot. In additional and/or alternative examples, the generated template may define a semantic frame for the trigger concept without additional generated slots. The system may determine that a statement is complete once all the slots are filled in by input text and/or auto-completed with generated slot-fillers. The user may provide user input to submit the entry for processing. In some examples, the system may receive user input to submit an incomplete statement, which may include a slot that is auto-completed by a suggested slot-filler text but is not confirmed by the user. In the present example, based on the submit request and the slots having slot-filler, the system may process the statement as including the suggested slot-filler text.

As described herein, the present system may generate template structures with incomplete statements to prompt additional input text from a user to iteratively guide the user to create complete structured representations. By guiding the user to create the complete structured representations with semantic frames, the system ensures that the user-provided natural language text may deterministically map to a target structured representation. The system may send the structured representation to the downstream application for the application to process and/or use.

The present natural language interfacing system provides a number of advantages over the traditional natural language interfacing systems, such as allowing the addition of knowledge representation structures of arbitrary size to the system. By providing the knowledge acquisition tool to interface with the user, the system is able to continuously acquire structural knowledge from untrained users, which is faster than having expert users manually generate structured systems using a fixed system that may be overloaded with useless data. The process of creating a structured knowledge representation system is not only time-intensive and resource-intensive (e.g., higher storage costs), but any adjustments to the data structure is similarly slow and costly. The knowledge acquisition tool guides a user to select a base template, which generates a partial semantic structure, and then continuously guides the user to select updated semantic templates and to provide input text to complete the semantic structure. By guiding the user to create this semantic structure, the knowledge acquisition tool increases the accuracy of text-to-structure mapping.

Moreover, by creating a system with a tool that can generate structured representations for the natural language content without fixed structures or expert users, the structured representations may grow and evolve with natural language input from a typical application user. This growth allows for a greater variety of knowledge acquisition topics to better engage users who may use different applications with a completely different purpose. Thus, the present natural language interfacing system provides improvement over traditional natural language interfacing systems by providing a faster, more efficient, and less costly method to generate structured representations for new natural language content. Finally, rather than remaining fixed like a traditional structured representation system that relies on manual creation of the structured representations, the present system may generate and evolve to new structured representations and continuously learn from more natural language input.

This system employs techniques from artificial intelligence, such as knowledge representation and reasoning (KRR) and machine learning (ML). In addition, it employs techniques from natural language processing (NLP), such as syntactic parsing, predicate-argument structure (PAS), entity type assignment, co-reference analysis, and statistical techniques such as distributional semantics (e.g. latent semantic analysis, random indexing, and topic modeling).

The techniques and systems described herein may be implemented in a number of ways. Example implementations are provided below with reference to the following figures.

Illustrative Environment

FIG. 1 illustrates an example system 100 of a natural language interfacing system including a knowledge acquisition tool. The system 100 may include user(s) 102 that utilizes device(s) 104, through one or more network(s) 106, to interact with the computing device(s) 108. In some examples, the network(s) 106 may be any type of network known in the art, such as the Internet. Moreover, the computing device(s) 108 and/or the device(s) 104 may be communicatively coupled to the network(s) 106 in any manner, such as by a wired or wireless connection.

The user(s) 102, via the device(s) 104, may interact with the computing device(s) 108. The user(s) 102 may include any number of human operators and may include any application users, content writers, developers, analysts, engineers, crowdsourcing network members, and the like. In various examples, the user(s) 102 may include formal collaborators or untrained individuals who simply perform tasks posed by the system, including answering simple binary questions (e.g., True/False, Yes/No) and/or providing more complicated answers with natural language input and template selection. In additional examples, the user(s) 102 may be part of an organized crowdsourcing network, such as the Mechanical Turk™ crowdsourcing platform. In examples, the user(s) 102 may include an application user, who is being prompted by an application to provide input text. The application may be integrated with any computer system that is configured to interact with the user(s) 102 by natural language input. The computer system may include, but is not limited to, a smart home system (e.g., thermostat, light, etc.), natural learning system, notetaking system, and the like.

The user(s) 102 may operate the corresponding device(s) 104 to perform various functions associated with the computing device(s) 108, which may include at least some of the operations and/or components discussed herein with respect to the computing device(s) 108. The user(s)102 may operate the device(s) 104 using any input/output devices including but not limited to mouse, monitors, displays, augmented glasses, keyboard, cameras, microphones, speakers, and headsets. In various examples, the computing device(s) 108 and/or the device(s) 104 may include a text-to-speech component that may allow the computing device(s) 108 to conduct a dialog session with the user(s) 102 by verbal dialog. It is to be appreciated that any discussion of receiving user input, as discussed herein, including typing input text and/or selection of templates or any UI elements, may be received by verbal dialog. The user(s) 102 may utilize device(s) 104 to interact with the computing device(s) 108 in any setting including, but not limited to, a site (i.e., a website), a stand-alone application, an application programming interface (API), a self-service interface, a self-service portal, and the like.

The device(s) 104 may be or include any suitable type of computing device(s), including, without limitation, a mainframe, a work station, a personal computer (PC), a laptop computer, a tablet computer, a personal digital assistant (PDA), a cellular phone, a media center, an embedded system, or any other sort of device or devices.

The device(s) 104 may receive content from the computing device(s) 108 including user interfaces to interact with the user(s) 102. In some examples, the components of the computing device(s) 108 are transmitted to and stored on the device(s) 104 as a standalone application and/or as an application programming interface (API). In various examples, the user(s) 102 may include any number of human collaborators who are engaged by the device(s) 104 to interact with the computing device(s) 108 and to verify the functions of one or more components of the computing device(s) 108. For instance, a human collaborator of the device(s) 104 may interact with the natural language component 110 and the device(s) 104 may receive a reading comprehension task that the system is currently working on. In the present example, the user(s) 102 may be presented a reading content via a user interface and the system may ask questions about the reading content to help train the system.

The computing device(s) 108 may include any components that may be used to facilitate interaction between the computing device(s) 108 and the user(s) 102. For example, the computing device(s) 108 may include a natural language component 110 and a knowledge acquisition tool 112 and associated components. The computing device(s) 108 may be or include any suitable type of computing device(s), including, without limitation, a mainframe, a work station, a personal computer (PC), a laptop computer, a local server, a network of computing devices, crowd computing, a cloud server, or any other sort of server device or devices.

The natural language component 110 may engage with the user(s) 102 through interactive dialogs. The natural language component 110 may use one or more models and/or natural language parsers to process the input text from the user(s) 102. The natural language component 110 may perform structure-to-text mapping for the system.

In some examples, the natural language component 110 may receive natural language reading content and may process the reading content. As will be described with greater detail herein with respect to FIG. 2, the natural language component 110 may process reading content to acquire knowledge from the reading content and to train the system. The natural language component 110 may receive the natural language reading content (e.g., stories, articles, manuals, etc.) from any source, including a vocabulary database, a shared library, an application, the user(s) 102, and the like. The natural language component 110 may use one or more models and/or natural language parsers to process the reading content and perform natural language understanding processes. The natural language component 110 may identify unknown concepts within the reading content while processing the reading content. In some examples, the natural language component 110 may generate a prompt about an unknown concept in the reading content to acquire knowledge from the user(s) 102. The natural language component 110 may conduct a dialog session with the user(s) 102 by using the knowledge acquisition tool 112 to interface with and receive input text from the user(s) 102.

The knowledge acquisition tool 112 may include a template interface component 114, a template renderer 116, and a concept recognizer component 118. As described herein, the system may use the knowledge acquisition tool 112 to perform text-to-structure mappings. The knowledge acquisition tool 112 may receive input text from the user(s) 102 and map the input text to a target representation language. As will be described herein with respect to FIG. 2, the knowledge acquisition tool 112 may use the template interface component 114, the template renderer 116, and the concept recognizer component 118 to continuously guide input text by iteratively generating and presenting templates in response to trigger concepts identified in the input text. The knowledge acquisition tool 112 and/or associated components may generate templates with additional generated slots. In various examples, the knowledge acquisition tool 112 and/or associated components may generate templates with additional generated slots. In various examples, to provide additional guidance for input text, the knowledge acquisition tool 112 and/or associated components may use a statistical model to auto-complete generated slots with suggested slot-filler text based on a statistical probability that the user(s) 102 may enter the suggested slot-filler text. The user(s) 102 may provide input selection to confirm the suggested slot-filler text or may provide input text for the generated slot.

The template interface component 114 may generate a user interface (UI) including UI elements to interact with the user(s) 102. The template interface component 114 may present a prompt to request knowledge from the user(s) 102 by user input. The template interface component 114 may receive the prompt from the system and the prompt may include any form of a request for information including questions about reading content, instructions to provide settings, prompts to add notes, and the like. To initiate interaction with the user(s) 102, the template interface component 114 may present a prompt and an empty entry interface. In some examples, the template interface component 114 may receive a single base template to present and may automatically display the associated incomplete statement without additional user input. In additional and/or alternative examples, the template interface component 114 may receive a list of base templates to present and may wait for a user selection of one of the base templates before displaying the associated incomplete statement.

The template interface component 114 may present a templates panel and/or selectable icons for user selection. The template interface component 114 may receive templates data from the template renderer 116 to present one or more templates in the templates panel in the UI. In the context of the present disclosure, the templates panel refers to a UI element that presents suggested templates to prompt the user(s) 102 for selection and may, at times, include a single selectable template based on the templates data received. The template interface component 114 may determine that the templates data includes metadata associated with additional information (e.g., definitions, examples, etc.) about the template and/or one or more slots labeled with field types. Based on the templates data received, the template interface component 114 may generate UI elements including selectable templates, blank text fields for slots labeled with field types, and selectable icons to link additional information about the template. In some examples, the template interface component 114 may present different UI elements including a selectable template with one or more selectable icons to allow the user(s) 102 to explore different information associated with the template, as illustrated and discussed in FIGS. 3, 4, 5, and 6, below.

The template interface component 114 may present a partial statement with one or more slots labeled with field types to guide input text. As described herein, the template interface component 114 may display an incomplete statement associated with a base template to initiate user interaction. The incomplete statement may include one or more slots to indicate one or more incomplete expressions that the user(s) 102 is requested to provide input text for in order to complete the statement. In some examples, the template interface component 114 may visually indicate an input text prompt within a slot to request input text to complete the expression. As input text is received for a slot, the template interface component 114 may display the incoming text in the slot to visually indicate the construction of the statement. In various examples, based on the input text, the template interface component 114 may receive updated templates data associated with a trigger concept identified in the input text. The process to identify the trigger concept will be described herein with respect to the concept recognizer component 118. The template interface component 114 may present updated templates in the templates panel for user selection. The updated templates are semantic templates that define different semantic frames for a trigger concept. In some examples, the template interface component 114 may present each updated template with its associated semantic frame information including roles, arguments, definitions, examples, and the like. In some examples, the updated templates may include one or more additional generated slots labeled with more specific field types to refine input text. For instance, a base template may include slots labeled with generic field types (e.g., antecedent and consequent). In response to receiving input text with a trigger concept, the updated templates may include one or more additional slots labeled with more specific field types (e.g., agent and focus).

The template interface component 114 may receive a selection for a semantic template and may incorporate the semantic template into the partial statement by nesting the semantic frame within the semantic frame structure for the partial statement. The template interface component 114 may repeat the process: (1) receiving input text; (2) receiving updated templates data; (3) presenting updated templates in the templates panel; (4) receiving a template selection; and (5) incorporating the semantic template into the partial statement. This process may be repeated until the statement is completed by having all template slots filled and/or by user input to submit the statement. The template interface component 114 may send the corresponding constructed semantic frame structure to a downstream application.

The template renderer 116 may determine the templates to present in the template interface component 114. As described herein, the template interface component 114 may initiate interaction with the user(s) 102 by presenting one or more base templates. The template renderer 116 may determine the one or more base templates based on the downstream application and/or the prompt presented to the user(s) 102. A base template may express an incomplete statement and provide a partial semantic structure for the knowledge acquisition tool 112 to construct a structured representation with. The base template may include one or more words based on a statement type and one or more slots that the user(s) 102 may fill in with input text to complete the statement. A statement and/or base template may be labeled by any statement types that may be used by the template renderer 116 for selecting a base template that is relevant to the current application and/or prompt. The statement types may include broad categories (e.g., rules, facts, clauses, states, etc.), narrow categories (e.g., rule types, fact types, clause types, settings, states, scenarios), domain-specific categories, and the like.

The template renderer 116 may receive input text and may output one or more semantic templates. The template renderer 116 may use the concept recognizer component 118 to identify a trigger concept from the input text and to instantiate semantic frames for the trigger concept. For each instantiated semantic frame, the template renderer 116 may generate a semantic template defining the semantic frame. In some examples, the template renderer 116 may turn a plain text argument from the input text into a blank slot labeled with the plain text argument as the field type. The template renderer 116 may also generate additional information to present a micro-dialogue with the user(s) 102 and may embed the additional information in templates data to be displayed by the template interface component 114. For instance, in the example template UI 124, the template renderer 116 may generate a semantic template defining a semantic frame for the word "like." The resulting micro-dialogue is presented in the example template UI 124 to the user(s) 102 with the selectable semantic template. If the semantic template is selected, the template renderer 116 may incorporate the semantic template into the incomplete statement by annotating the incomplete statement with the associated semantic frame as indicated by the example template UI 126. In some examples, the template renderer 116 may determine to solicit extra information based on the received instantiated semantic frame and may generate the template with additional generated slots labeled with more specific roles. In various examples, to provide additional guidance for input text, the template renderer 116 and/or the concept recognizer component 118 may use a statistical model to auto-complete any generated slots with suggested slot-filler text ("unstructured slot-filler") based on a statistical probability that the user may intend to enter the unstructured slot-filler. The user may provide input selection to confirm the suggested slot-filler text or may provide input text for the generated slot.

The concept recognizer component 118 may determine a trigger concept from input text and instantiate semantic frames for the trigger concept. The concept recognizer component 118 may use a concept vocabulary that determines each predicate corresponds to a semantic frame. An instantiated semantic frame includes a semantic frame defined with a predicate and one or more arguments. As described herein, a trigger concept may include any word, detected in the input text, that may be associated with a particular lexical trigger and/or grammatical feature.

The concept recognizer component 118 may determine the trigger concept based on one or more semantic parsers and/or one or more parsing schemes used. In an example, a parsing scheme may include determining a trigger concept based on identifying a predicate in the input text and/or on a preference hierarchy (e.g., verbs first, then adjectives, then nouns, etc.). In various examples, the trigger concept may include any text selected from the input text including a verb, an adverb, a noun, an adjective, and the like. In some examples, the parsing scheme may use syntactic heuristics to determine the trigger concept with a broadest syntactic scope, wherein the broadest syntactic scope is determined relative to the syntactic scope of other words in the input text. For instance, given an example input text, "I want to eat food," the syntactic heuristics may determine there are two verbs (e.g., want and eat) and may determine to interpret the head verb (e.g., want) first. In additional and/or alternative examples, the parsing scheme may include determining trigger concepts based on labeling a part-of-speech for a generated slot (e.g., "event"=verbs) and using the label to determine the trigger concepts.

The concept recognizer component 118 may generate new semantic frame structures for the trigger concept. In some examples, the new frame structures are stored in data structures with an inheritance hierarchy that allows multiple inheritances and includes a definition for a focal role. The concept recognizer component 118 may generate a new semantic frame structure by instantiating a new frame structure and defining the new frame structure for a trigger concept by defining the roles for the trigger concept, providing a parent node, and writing a short definition and/or example. As will be described with greater detail herein with respect to FIG. 2, the concept recognizer component 118 may use one or more semantic parsers to process input text to determine frame sense for the trigger concept and to generate corresponding new semantic frame structures.

In a non-limiting example, the example system 100 may be integrating within a natural learning application and may receive an example natural language story 120. The example system 100 may map each sentence in the example natural language story 120 to a structured representation and may answer questions about the story content to acquire new knowledge. In the present example, the example system 100 may present the question to request knowledge from the user(s) 102. The example system 100 may generate an example template UI 122 to initiate interaction with the user(s) 102 and may generate templates to guide user input as depicted in example template UI 124 and example template UI 126.

The natural language component 110 may receive the example natural language story 120 and perform natural language processing on the content. The natural language component 110 may process the example natural language story 120 and determine an unknown concept in the reading content that the present system does not understand. The example natural language story 120 includes the following reading content:

Zoey went to the plant store. She liked some mint plants she saw. She bought them from the store and brought them home.

The knowledge acquisition tool 112 may determine to prompt the user(s) 102 to provide knowledge for the system to learn the unknown concept in the example natural language story 120. The template interface component 114 may generate the example template UI 122 to initiate interaction with the user(s) 102. The example template UI 122 may display a prompt for input with, "Why does Zoey buy the plants from the store?"

The template interface component 114 may initiate interaction with the user(s) 102 by providing a selection of base templates in the example template UI 122. As depicted, the example template UI 122 presents the selection of base templates including "if/then," "often when/then," and "before/it is required that" partial statements that the user(s) 102 may select from and build concept-nodes onto.

In the present example, as depicted in the example template UI 124, the user(s) 102 has selected the "if/then" template as the root-concept to construct a statement with and has provided input text, "a person likes a thing," to fill a first empty slot in the statement. In response to receiving input text, the concept recognizer component 118 may perform semantic parsing on the input text to determine the trigger concept is the word "likes." The concept recognizer component 118 may instantiate a new semantic frame for the word "likes." In response, the template renderer 116 may generate a semantic template defining the semantic frame for the word "likes." The template renderer 116 also generated additional information to present a micro-dialogue with the user(s) 102. The resulting micro-dialogue is presented in the example template UI 124 to the user(s) 102 with the selectable semantic template.

In response to the selection of the semantic template, the template renderer 116 incorporates the semantic template into the partial statement by annotating the partial statement with the associated semantic frame as indicated in the example template UI 126.

In the present example, the example template UI 126 receives additional input text. In response to receiving additional input text, "the person wants to own the thing," the concept recognizer component 118 may perform semantic parsing on the input text to determine a new trigger concept is the word "wants." Using the results of the semantic parsing to determine the frame sense for "wants,"

the concept recognizer component 118 may instantiate new semantic frames for the word "wants." In response, the template renderer 116 may generate a list of semantic templates defining the different semantic frames for the word "wants." As depicted in the example template UI 126, the template interface component 114 presents the list of semantic templates along with identifying the focal roles (e.g., "want" and "have, hold") for the associated semantic frames in the templates panel. Based on a user selection of a template from the list of semantic templates, the corresponding semantic frame may indicate the user's intent for the true meaning for the word "wants."

Figure 2:
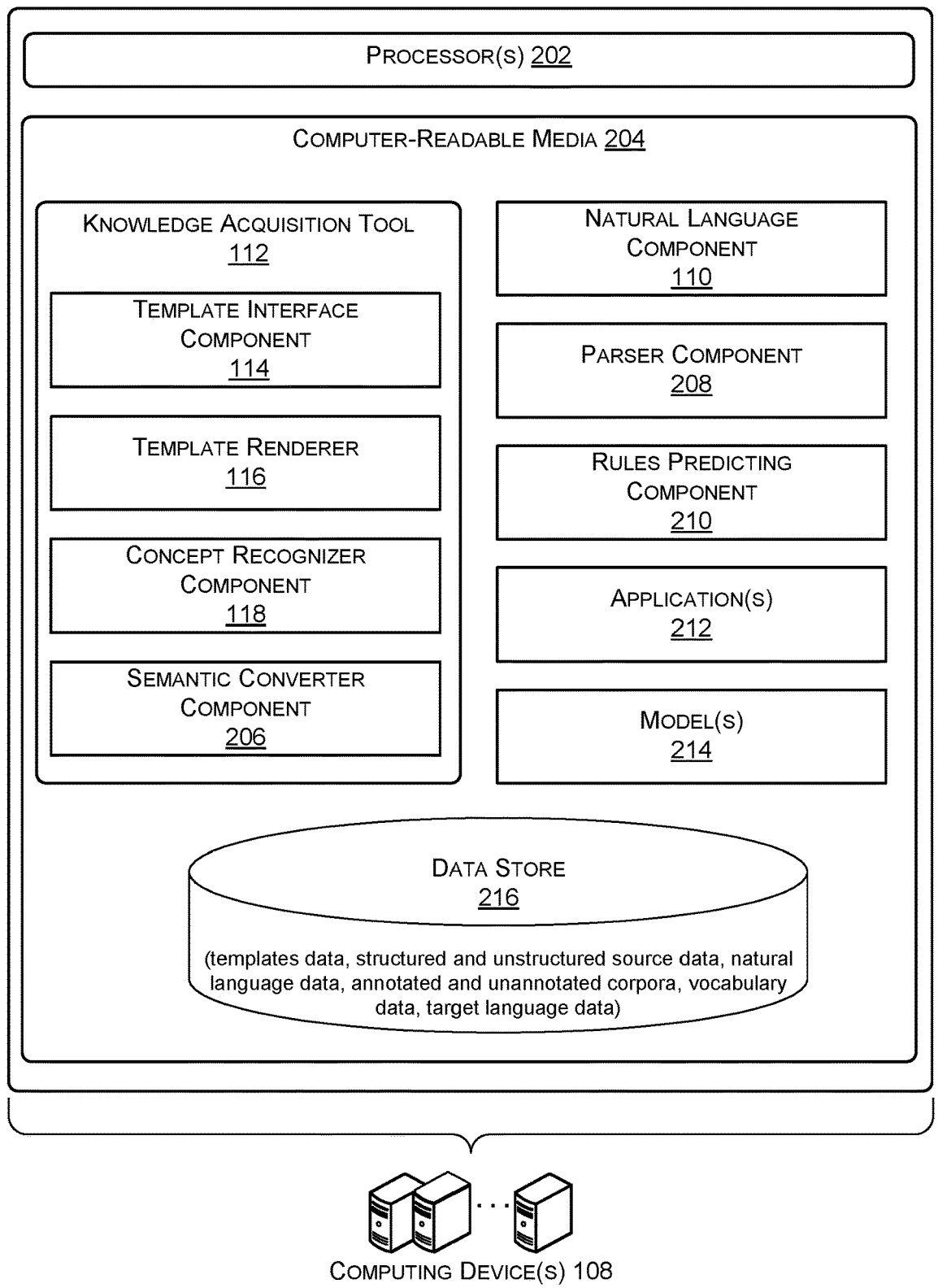
FIG. 2 is a block diagram of an example computing architecture associated with the system of FIG. 1.

FIG. 2 is a block diagram of an illustrative computing architecture 200 of the computing device(s) 108 of FIG. 1. The computing architecture 200 may be implemented in a distributed or non-distributed computing environment.

The computing architecture 200 may include one or more processors 202 and one or more computer-readable media 204 that stores various modules, data structures, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store the knowledge acquisition tool 112 and associated components, the natural language component 110, a parser component 208, a rules predicting component 210, application(s) 212, model(s) 214, and data store 216, which are described in turn. The components may be stored together or in a distributed arrangement.

The knowledge acquisition tool 112 may include the template interface component 114, the template renderer 116, the concept recognizer component 118, and a semantic converter component 206. The knowledge acquisition tool 112 may leverage its components, the model(s) 214, and the data store 216 to build and evolve the knowledge representation structures and templates database. The knowledge acquisition tool 112 may collect natural language data, templates data, source data, and annotated and unannotated corpora as needed by the components. The knowledge acquisition tool 112 may use a database of natural language data to map statements in natural language expressions to structured representations.

In some examples, the knowledge acquisition tool 112 and/or associated components may generate a semantic frame structure to represent a natural language statement acquired by user input. The knowledge acquisition tool 112 may construct a partial semantic frame structure to express a current incomplete statement and may continuously build the partial semantic frame structure to align with changes to the incomplete statement. In response to user input for submitting the statement as complete, the knowledge acquisition tool 112 may submit the corresponding constructed semantic frame structure to a downstream application.

The knowledge acquisition tool 112 may train models needed by the components and/or for a downstream application. In some examples, the knowledge acquisition tool 112 may trigger processes to generate new semantic frames for acquiring knowledge. In additional examples, the knowledge acquisition tool 112 may receive natural language reading content and may process the reading content to generate a structured representation of the reading content. The knowledge acquisition tool 112 may generate a prompt about an unknown concept in the reading content to acquire knowledge from the user(s) 102. In additional examples, the knowledge acquisition tool 112 may receive domain-specific reading content for a downstream application and may process the domain-specific reading content to generate a structured representation of the reading content. The knowledge acquisition tool 112 may generate a prompt about an unknown concept in the domain-specific reading content to acquire knowledge from the user(s) 102.

In various examples, the knowledge acquisition tool 112 and/or one or more associated components may be part of a standalone application that may be installed and stored on the device(s) 104.

The template interface component 114 may generate a user interface to guide user input to acquire knowledge. As described herein with respect to FIG. 1, the template interface component 114 may generate a UI including UI elements to interact with the user(s) 102. The template interface component 114 may present the updated template(s) in the templates panel to guide the user input to iteratively refine the generated template. The template interface component 114 may repeat the process: (1) receiving input text; (2) receiving updated templates data; (3) presenting updated templates in the templates panel; (4) receiving a template selection; and (5) incorporating the semantic template into the partial statement. This process may be repeated until the statement is completed by having all template slots filled and/or by user input to submit the statement. The template interface component 114 may send the corresponding constructed semantic frame structure to the semantic converter component 206 to process the structured representation for a downstream application use and/or for generating training data.

The template renderer 116 may generate semantic templates relevant to a trigger concept. In some examples, the template renderer 116 may generate and manage templates data, including adding metadata with frame information and/or examples, and passing the templates data to the template interface component 114 for presentation on a user interface. As described herein with respect to FIG. 1, the template renderer 116 may receive one or more input semantic frames from the concept recognizer component 118. For each semantic frame received, the template renderer 116 may generate corresponding template data to store templates information associated with the semantic frame. In some examples, the template renderer 116 may generate the semantic template with one or more generated slots based on the roles and/or arguments defined by the semantic frame. The one or more generated slots may be labeled with more specific field types (e.g., roles, arguments, etc.) to refine user input. Since each semantic template is generated for a different semantic frame, each semantic template may define a different frame sense for the trigger concept. As described herein, the concept recognizer component 118 generates each semantic frame with an accuracy score for the frame sense for the trigger concept. The template renderer 116 may include the associated confidence and/or accuracy score in the template data. The template renderer 116 and/or the template interface component 114 may determine a ranking for a list of templates to present, with the ranking based on the associated confidence and/or accuracy.

The template renderer 116 may include a database of source templates associated with a downstream application. For instance, the template renderer 116 may retrieve one or more domain-specific base templates to initiate user interaction. As described herein, a base template may express an incomplete statement and may include one or more words based on a statement type and one or more slots that the user(s) 102 may fill in with input text to complete the statement. A statement and/or base template may be labeled by any statement types that may be used by the template renderer 116 for selecting a base template that is relevant to the downstream application. The template renderer 116 may select templates from the database of source templates to present in the list of base templates. In some examples, the list of base templates may be based on the statement type(s) that is relevant to the downstream application and the list may be ordered based on the relevance. For instance, if the present system is integrated with a natural learning application setting and the prompt is asking a question about a story, the list of base templates may include templates for the statement type of goal clause (e.g., if/then, often when/then, etc.). In another instance, if the system is integrated with a smart thermostat application setting and the prompt is asking the user(s) 102 to provide thermostat settings, the list of base templates may include a template for the statement type of conditional rule (e.g., if/then). As described herein, the list of base templates may include only one base template based on the knowledge requested by the downstream application. In the example for the smart thermostat application setting, the template renderer 116 may also use domain templates for domain statement types for setting different thermostat rules including temporal rule, (e.g., if time is/then), master setting rule (e.g., if the thermostat is on, then set the minimum temperature to), conditional override rule, and the like.

In various examples, the template renderer 116 may use any portion of the templates data, source data, and/or annotated and unannotated corpora, stored in the data store 216, as input to train one or more model(s) 214.

The concept recognizer component 118 may determine a trigger concept from the input text and instantiate semantic frames for the trigger concept, as described herein. In response to the user(s) 102 filling in a slot with input text, the concept recognizer component 118 may process the input text, select a trigger concept, and determine frame sense for the trigger concept. In some examples, the concept recognizer component 118 may use a set of syntactic heuristics to select the trigger concept with the widest scope at each interaction. The concept recognizer component 118 may generate a semantic frame for a frame sense by instantiating a semantic frame structure and defining a predicate and one or more semantic arguments for the frame sense.

The concept recognizer component 118 may use the parser component 208 to process input text to determine frame sense for the trigger concept. In some examples, based on various factors including training data available and downstream application, the concept recognizer component 118 may determine to use one or more of two semantic parsers that may produce potentially competing interpretations. Based on parsing the input text, the concept recognizer component 118 may receive one or more frame senses for the trigger concept and associated accuracy scores. Based on the accuracy score meeting an accuracy threshold, the concept recognizer component 118 may generate a semantic frame for frame senses.

In some examples, the concept recognizer component 118 may determine to use a transformer-based neural semantic parser. The model for the neural semantic parser may be fine-tuned using a corpus and annotated data. The concept recognizer component 118 may apply the neural semantic parser on input data for a domain with large reusable base vocabulary, where large is defined by a training set size threshold (e.g., less than 50, greater than 10 k, greater than 100 k, etc.) for the particular model selected.

In additional and/or alternative examples, the concept recognizer component 118 may determine to use an embedding-based parser. The model for the embedding-based parser may be trained using a smaller training data set relative to the training set for the neural semantic parser. Initially, the embedding-based parser may train a model with training data including structure representations with frame embeddings generated from minimal hand authored examples. The embedding-based parser may retrieve k-nearest frames based on an embedding match between the partial statement entered thus far. The embedding-based parser may incorporate declaratively specified mapping templates, to allow the parser to quickly adapt to a new domain. As the concept recognizer component 118 use the embedding-based parser to generate new frames for applications, the concept recognizer component 118 may receive user-corrected output of the embedding-based parser generated frame. The corrected output frames and/or the final structure representations with embedded frames may be used as training data to improve the parsing model. Accordingly, the present system including the concept recognizer component 118 and the embedding-based parser may improve with use.

The concept recognizer component 118 may continuously try to match user input to a possible statement as expressed in the target representation language. The possible statement may be incomplete template representations and may require additional input from the user to complete. The concept recognizer component 118 may use machine learning models including a series of classifiers (e.g. deep-learning based statistical models for concept disambiguation and slot-filling) that use the natural language data to select a potential statement and constrain potential arguments. In addition to the user input, the classifiers may use the background context (e.g. application, question prompt) that surrounds the text-to-structure mapping application, to perform more accurate concept recognition/disambiguation and slot filling.

In some examples, the concept recognizer component 118 may perform processes to help generate templates and slot fillers. As described herein, the system may present natural language content to the user(s) 102 and conduct dialog sessions with the user(s) 102 to allow the system to understand the natural language content. The concept recognizer component 118 may determine each partial statement as a natural language expression. As described herein, the concept recognizer component 118 may generate frames for a trigger concept selected from input text. The template renderer 116 use the generated frames to generate templates. In some examples, the concept recognizer component 118 may generate additional slots corresponding to frame arguments and the generated slots may be filled with argument text identified in the input text. In various examples, the concept recognizer component 118 may generate additional empty slots corresponding to missing inputs. The concept recognizer component 118 may use a sequence generator that operates over a pairing of the partially completed statement and any existing mappings between its elements and natural language data. The concept recognizer component 118 may call the rules predicting component 210 to use a statistical text-plausibility model to generate suggested slot-filler text. The concept recognizer component 118 may rank and filter the suggested slot-filler text.

The semantic converter component 206 may collect the natural language expression for a completed statement once the user(s) 102 is finished and may map the natural language expression back to the target representation language statements that generated them. Each statement can then be composed to produce a final structured representation. The application then operates over the resulting structure (e.g. evaluates a query, takes an external action, updates the application state).

In some examples, in response to user input for submitting an entry, the semantic converter component 206 may receive the set of instantiated semantic frames. The semantic converter component 206 may be domain-specific and may further process the frames if necessary. For instance, in a rule application setting, the semantic converter component 206 may convert the resulting frames into a horn-clause-like statement. In various examples, if the result of a submitted entry includes partial frame semantic parse of input text, the semantic converter component 206 may use domain-specific logic to further convert the frame semantic interpretation into usable data if needed.

In various examples, in response to user input for submitting an entry, the semantic converter component 206 may process the resulting structures to collect templates data and/or training data to improve various models used by the present system. The semantic converter component 206 may receive sets of instantiated semantic frames and may remove constants added to slots to create reusable templates.

The natural language component 110 may engage with the user(s) 102 through interactive dialog, as described herein. The natural language component 110 generates a user interface to engage in dialog sessions with the user(s) 102 by natural language expressions. The natural language component 110 may use one or more models and/or natural language parsers to process the input text from the user(s) 102. For instance, the user(s) 102 may type in input in natural language text, and the system may process the input and may present micro dialogs related to the input. The natural language component 110 may perform structure-to-text mapping for the system.

The natural language component 110 allows the computing device(s) 108 to engage in extended dialog sessions with an individual human user(s) 102 via the device(s) 104.

In some examples, the natural language component 110 may receive natural language reading content and may process the reading content. The natural language component 110 may process reading content to generate a structured representation of the reading content. The natural language component 110 may use one or more models and/or natural language parsers to process the reading content and perform natural language understanding processes. The natural language component 110 may identify unknown concepts within the reading content while processing the reading content. In some examples, the natural language component 110 may generate a prompt about an unknown concept in the reading content to acquire knowledge from the user(s) 102. The natural language component 110 may receive input text from the user(s) 102 and may use the knowledge acquisition tool 112 to generate a semantic frame structure for the unknown concept.

The parser component 208 may include any parser used by the present system including the knowledge acquisition tool 112 and associated components and/or the natural language component 110. As described herein, the parser component 208 may include at least two semantic parsers that are used by the concept recognizer component 118 to determine trigger concepts from the input text and determine frame sense for the input text.

The parser component 208 may include a neural semantic parser. The neural semantic parser may treat frame parsing as a multi-task problem involving related classification and generative tasks. For instance, given a sentence and a frame-triggering span, the model decomposes parsing into frame-sense disambiguation (multi-label classification), argument span detection (generative), and role-labeling (classification). Since these tasks are related, the neural semantic parser may use a joint multi-task encoder-decoder architecture, wherein the encoder layer is shared among the various tasks, with different decoders used depending on the task type. In some examples, the neural semantic parser may train the model(s) 214 on a 500K annotated frame sentences, available in an open domain frame database. By fine-tuning a pre-trained transformer-based language model (e.g., GPT2 or T5), the neural semantic parser model achieved the best results using T5 as the base encoder/decoder. As the user(s) 102 continues to provide input text, the parsing results may consider the additional context, which may help to disambiguate the correct frame sense.

The parser component 208 may include an embedding-based heuristic parser. To complement the neural semantic parser, which needs a large number of annotated examples for training, the embedding-based heuristic parser may use an unsupervised K-NN based approach for frame parsing that can work with a handful of examples per frame. The approach relies on word embeddings and computes the similarity between a frame embedding (constructed by aggregating embeddings for words in frame examples and trigger lemmas, specified in the frame definition) and the sentence embedding (approximated as the sum of embeddings for words in the sentence). The algorithm also detects argument spans using syntactic heuristics based on a dependency parse of the sentence. The embedding-based heuristic parser assigns a role for each span by considering how well the type of the span phrase matches the expected role type as inferred from frame examples (type similarity checking is also done using embeddings). As described herein, the knowledge acquisition tool 112 including the template renderer 116 and the concept recognizer component 118 may use the parser component 208 to determine frame sense to generate semantic frames, generate templates, and generate additional slots labeled with frame arguments and/or roles to refine guidance for user input. In additional examples, the knowledge acquisition tool 112 may further refine guidance for user input by using the rules predicting component 210 to generate suggested slot-filler text to auto-complete a generated slot.

The rules predicting component 210 may train a statistical model to generate auto-complete slot-filler suggestions. To provide guidance for input text, the rules predicting component 210 may train and use a statistical model to generate suggested slot-filler text based on determining a statistical probability that the user(s) 102 may enter the suggested text to fill in a generated slot.

In various examples, the rules predicting component 210 may include a crowd-sourced dataset of common-sense explanatory knowledge. The rules predicting component 210 may define ten dimensions of causal explanation, focusing on events, states, motivations, emotions, and naive psychology. The crowd-sourced dataset may include both general and specific semi-structured inference rules that apply to short stories. These rules may be acquired via crowdsourcing, and the rules predicting component 210 may use the neural models trained on the semi-structured rules to produce human-like inferences for story understanding. The rules predicting component 210 may train a rule generation model. For each sentence in a story, the rules predicting component 210 may use a model to predict unstructured textual causal inferences. These uninterpreted inferences are used to seed slots in rule templates generated by the knowledge acquisition tool 112 and to guide the user(s) 102 to produce story-relevant rules with high confidence scores.

In response to input text received to fill in one of the generated template slots, the rules predicting component 210 may apply a model on the text typed so far (i.e., in earlier slots of the template) and generate potential completions. For instance, if a user(s) 102 is entering input text for "If/then" statement with the antecedent "a person eats a cookie," the rules predicting component 210 may generate a consequent with "the person is happy" using a statistical rule generation model.

In some examples, the rules predicting component 210 may use specified frame semantics to filter out incompatible language model suggestions. For instance, the user(s) 102 may provide knowledge about a soccer story, and starts typing: "If a player gets" and specifies the interpretation for the verb "get" as the semantic frame "arriving-at-a-location." In the present example, the rules predicting component 210 may use a dataset generated for a children's story about soccer about an event "Olivia plays in a soccer game" to provide suggestions for the current soccer story. The example dataset may include possible causes leading to a given event/state and possible effects as a result of the event/state. For instance, the following data table may illustrate a portion of such dataset:

| Possible Causes >> | Event/State | >> Possible Effects |
|---|---|---|
| Olivia feel(s) competitive | <event> | Olivia runs toward the goal |
| Olivia want(s) to play soccer | | Olivia gets the ball |
| Olivia goes to a soccer game | | Olivia want(s) to win |
| Olivia likes soccer | | Olivia scores a goal |
| . . . | | . . . |

In the present example soccer story, the semantic template may include an unfilled slot labeled with "destination." If the user(s) 102 continues entering text in the slot labeled with "destination," the rules predicting component 210 may use the model to generate suggested slot-filler text and may produce the following suggested text: " . . . a ball," " . . . to the goal," and " . . . into trouble," given the prior text "If a player gets." However, because the user(s) 102 has previously selected the semantic template for "get" and the current active slot is "destination," the only compatible suggestion is " . . . to the goal." To identify compatible suggestions, the rules predicting component 210 may use a semantic parser on the full generated statement (including the prior text) and filter out suggestions where the frame doesn't match the prior specified frame. In the above example, the rules predicting component 210 may throw out "gets a ball" (where "get" means "acquire"), and "gets into trouble" (where "get" means "transition-to-state"), since it does not match the earlier specified interpretation of "get" (arrive-at-location).

The application(s) 212 may include any downstream application using the knowledge acquisition tool 112 to interface with the user(s) 102. The application(s) 212 may store domain-specific data to provide context for generating templates and/or frame structures. In some examples, the application(s) 212 may also store domain-specific logic for the semantic converter component 206 to convert structured representation into usable data.

The application(s) 212 may use the knowledge acquisition tool 112 to request structured input from the user(s) 102. The application(s) 212 may receive the resulting structure from the semantic converter component 206 and may operate over the resulting structure.

In various examples, the system may train one or more ML model(s) 214 using labeled data as training data. Machine learning generally involves processing a set of examples (called "training data") to train one or more ML model(s) 214. The model(s) 214, once trained, is a learned mechanism that can receive new data as input and estimate or predict a result as output. Additionally, the model(s) 214 may output a confidence score (also referred herein as "confidence," "confidence level," "statistical probability," or "accuracy") associated with the predicted result. The confidence score may be determined using probabilistic classification and/or weighted classification. For example, a trained ML model(s) 214 can comprise a classifier that is tasked with classifying unknown input as one of the multiple class labels. In additional examples, the model(s) 214 can be retrained with additional and/or new training data labeled with one or more new types (e.g., rules) to teach the model(s) 214 to classify unknown input by types that may now include the one or more new types.

In additional and/or alternative examples, the ML model(s) 214 may include a generative model, which is a statistical model that can generate new data instances. Generative modeling generally involves performing statistical modeling on a set of data instances X and a set of labels Y in order to determine the joint probability p(X, Y) or the joint probability distribution on X×Y. In various examples, the statistical model may use neural network models to learn an algorithm to approximate the model distribution. In some examples, the generative model may be trained to receive input text and a frame-triggering span and may output a full or partial frame semantic parse of the input text. In an additional example, the generative model may output the accuracy associated with the frame sense by the generative model. As described herein, the parser component 208 may use a generative model that performs an argument span detection given an input sentence and a frame-triggering span.

In the context of the present disclosure, the input may include, text that is to be handled according to a trigger concept, and the trained ML model(s) 214 may be tasked with receiving an input text and outputting a semantic template that defines a semantic frame for the trigger concept.

In some examples, the trained ML model(s) 214 may classify an input text with a trigger concept to one of the semantic frames and determine an associated confidence score (e.g., accuracy). In various examples, if the trained ML model(s) 214 has low confidence (e.g., a confidence score is at or below a low threshold) for a frame sense to span to an input text, this low confidence may result in the system determining to not generate an associated frame and/or template. An extremely high confidence score (e.g., a confidence score is at or exceeds a high threshold) may indicate the semantic frame is likely the correct frame sense for an input text, and the template associated with the semantic frame may be ranked higher on a template selection list. After the generated templates have been corrected by user input, the data with the semantic frames may be labeled and annotated by a user, the data may be used as additional training data to retrain the model(s) 214. Thus, the system may retrain the ML model(s) 214 with the additional training data to generate the new ML model(s) 214. The new ML model(s) 214 may be applied to new frames, rules, and/or parsers as a continuous retraining cycle to improve the knowledge acquisition tool 112 and associated components, the natural language component 110, the parser component 208, and/or the rules predicting component 210.

The ML model(s) 214 may represent a single model or an ensemble of base-level ML models and may be implemented as any type of model(s) 214. For example, suitable ML model(s) 214 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, linear discriminant analysis (LDA), generative models, discriminative models, or an ensemble thereof. An "ensemble" can comprise a collection of the model(s) 214 whose outputs are combined, such as by using weighted averaging or voting. The individual ML models of an ensemble can differ in their expertise, and the ensemble can operate as a committee of individual ML models that are collectively "smarter" than any individual machine learning model of the ensemble.

The data store 216 may store at least some data including, but not limited to, data collected from the knowledge acquisition tool 112 and associated components, the natural language component 110, the parser component 208, the rules predicting component 210, and the model(s) 214, including data associated with templates data, source data, knowledge base data, natural language data, general rule templates data and training data. In some examples, the data may be automatically added via a computing device (e.g., the computing device(s) 108, the device(s) 104). The templates data may include static rules data and generated inference rules data and may correspond to one or more context. In various examples, the static rules data may include a fixed collection of rules, the individual rules may be associated with a confidence level. The template renderer 116 and concept recognizer component 118 may operate over a specific core theory of logical forms (e.g., logical predicates, functions, formulae) which can be interpreted by the parser, and the core theory data may include vocabulary data and any data to produce rules and/or templates that conform to the core-theory. For instance, if the core-theory uses a frame-slot structure (e.g. FrameNet) for representing concepts/relations, then the core theory data may include frame structure data, concept and relationship data, ontology data, and the like. Training data may include any portion of the data in the data store 216 that is selected to be used to train one or more model(s) 214. In additional and/or alternative examples, at least some of the data may be stored in a storage system or other data repository.

Figure 3:
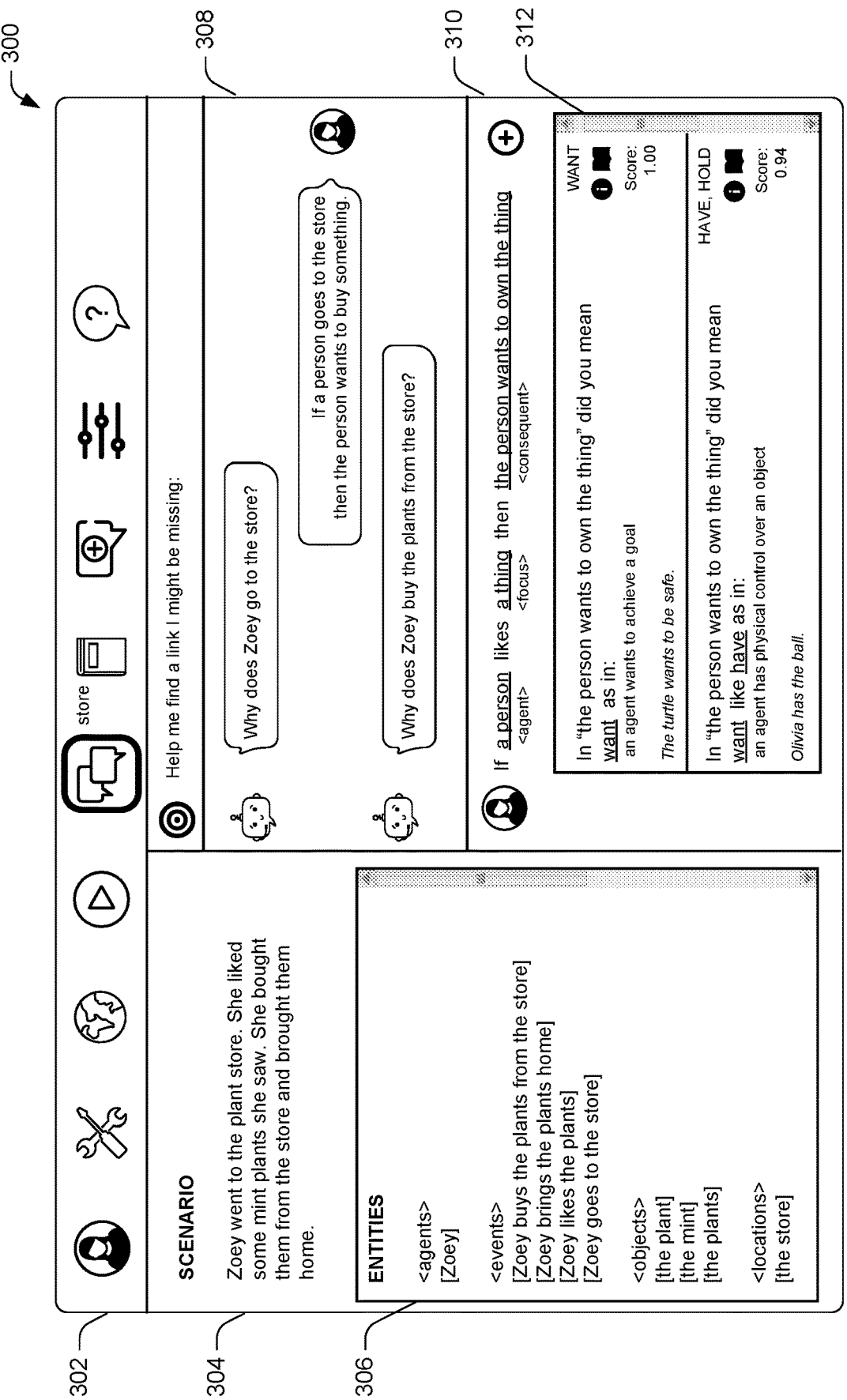
FIG. 3 illustrates an example user interface of the present disclosure integrated within a natural learning application.

FIG. 3 illustrates an example user interface (UI) 300 of a device implementing the knowledge acquisition tool in a natural language learning application, as discussed herein. In some instances, the example UI 300 may present a UI including an example navigation window 302 and associated components to allow the user(s) 102 to interface with natural language learning application using the knowledge acquisition tool 112. The example navigation window 302 may include an example story 304, an example parse 306, an example dialog window 308, an example template UI 310, and an example templates panel 312.

As a non-limiting example, the template interface component 114 may generate the example navigation window 302 and associated UI elements. The natural language component 110 may receive the example story 304 and parse the story to generate a structured representation of the sentences in the story and generate the example parses 306. The natural language component 110 may map each sentence in the example story 304 to a structured representation and may generate questions about the story content to acquire new knowledge. In the present example, the knowledge acquisition tool 112 may present questions to request knowledge from the user(s) 102.

The template interface component 114 may present the content of the example story 304 along with the example parse 306 to indicate the structured knowledge generated by the present system and may further present a prompt for the user(s) 102 to provide knowledge for the system. The example dialog window 308 may illustrate an example dialog between the natural language learning application and the user(s) 102. The example dialog window 308 may display a prompt for input with, "Why does Zoey buy the plants from the store?"

As depicted in the example template UI 310, the user(s) 102 has previously entered "a person likes a thing" and has selected a template to annotate the trigger concept "likes." The template interface component 114 indicates the generated slots labeled with "agent" and "focus" for the semantic frame. Additionally, as depicted in the example template UI 310, the user(s) 102 recently entered "the person wants to own the thing" as input text, and the example templates panel 312 is presenting a list of semantic templates for user selection.

In the present examples, the concept recognizer component 118 may determine the user input includes two verbs, "wants" and "owns," and has selected "wants" as the trigger concept. Although the example templates panel 312 is only displaying the top two semantic templates, the templates generator 116 may generate as many templates as the number of semantic frames generated by the concept recognizer component 118. The template interface component 114 may display definitions and examples based on the information included in the metadata.

FIG. 4 illustrates example user interfaces (UI) 400 of a device implementing the knowledge acquisition tool with an example template generating flow, as discussed herein. In some instances, the example UI 400 may present example template generating flow UIs including the example template UI's 402, 404, and 410.

The template interface component 114 may generate the example template UI 402 to initiate interaction with the user(s) 102 by providing a selection of base templates in the example template UI 402. As depicted, the example template UI 402 presents the selection of base templates including "if/then," "often when/then," and "before/it is required that" partial statements that the user(s) 102 may select from and build concept-nodes onto.

The example template UI 404 may present an example template 406 and an example template 408 in the templates panel for selection. In the present example, as depicted in the example template UI 404, the user(s) 102 has selected the "if/then" template as the root-concept to construct a statement with and has provided input text, "the child takes the cookie from the jar" toward completing the statement. In response to receiving input text, the concept recognizer component 118 may use one or more parsing models to perform semantic parsing on the input text to determine a trigger concept is the word "takes." The concept recognizer component 118 may generate one or more semantic frames for the word "takes" and may generate an associated accuracy score for each generated semantic frame. In response, for each generated semantic frame received from the concept recognizer component 118, the template renderer 116 may generate a semantic template defining the particular semantic frame for the word "takes." As depicted in the example template UI 404, the template renderer 116 may generate at least the example template 406 and the example template 408. As illustrated, while both the example template 406 and the example template 408 define frames for the same trigger concept word "takes," the example template 406 defines a "remove/take" frame and the example template 408 defines a "consume/take" frame. The template renderer 116 may also include additional information to present micro-dialogues for the example template 406 and the example template 408. The resulting micro-dialogue is presented in the example template UI 404 to the user(s) 102 with the selectable semantic templates.

In response to the selection of the example template 406, the template renderer 116 may incorporate the example template 406 into the trigger concept "takes" by annotating the partial statement with the associated "remove/take" semantic frame as indicated in the example template UI 410. As illustrated in the example template UI 410, the previously unstructured input text that was received as "the child takes the cookie from the jar" in the example template UI 404 is now annotated with the semantic frame for "remove/take" and the example template 406 includes three generated slots labeled with "agent," "object," and "container." The template renderer 116 may determine slot-filler arguments from the input text. The three generated slots are filled with the slot-filler arguments, "the child," "the cookie," and "from the jar," as depicted in the example template UI 410. Additionally, as depicted in the example template UI 410, the partial statement now includes the input text annotated by the semantic frame for the example template 406.

The example template UI 410 may present an example template 412 and an example template 414 in the templates panel for selection. In the present example, the example template UI 410 may display the partial statement with the nested template, and the user(s) 102 can recursively refine unstructured slot fillers as depicted in the example template UI 410. For instance, in the example template UI 410, the concept recognizer component 118 may generate semantic frames with different frame sense for the word "cookie." In response, for each generated semantic frame, the template renderer 116 may generate a semantic template defining the particular semantic frame for the word "cookie." As depicted in the example template UI 410, the template renderer 116 may generate at least the example template 412 and the example template 414. The template renderer 116 may also include additional information to present micro-dialogues for the example template 412 and the example template 414. The resulting micro-dialogue is presented in the example template UI 410 to the user(s) 102 with the selectable semantic templates.

In some examples, the user(s) 102 can also choose to leave slots as unstructured text. For instance, in the example template UI 410, the user(s) 102 may not need to specify the desired sense of "cookie," in which case, the entry can be submitted without full specification.

Figure 5:
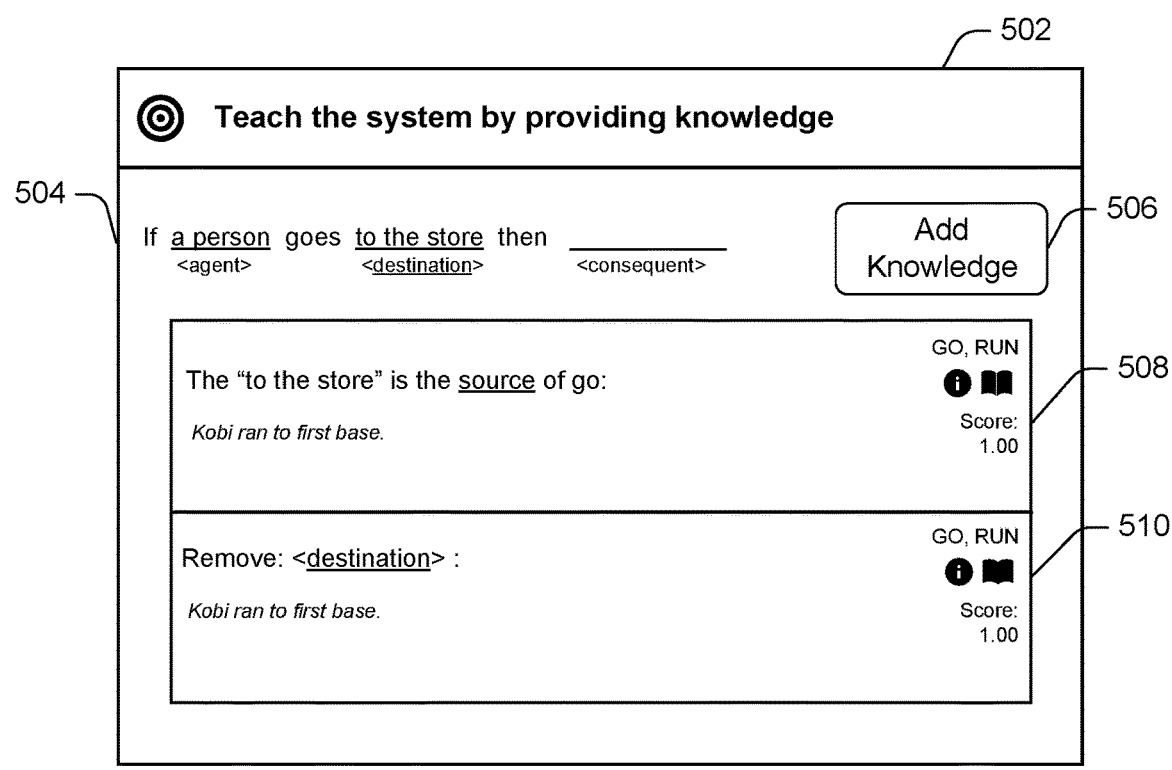
FIG. 5 illustrates an example user interface of the present disclosure for an example template editing.

FIG. 5 illustrates example user interfaces (UI) 500 of a device implementing the knowledge acquisition tool with an example template editing, as discussed herein. In some instances, the example UI 500 may present a UI including an example template UI 502 to interface with the user(s) 102. The example template UI 502 may include an example statement 504, an example submit icon 506, an example slot relabeling 508, and an example slot label removal 510.

The template interface component 114 may generate the example template UI 502 to interact with the user(s) 102 by presenting the example statement 504 to receive edits. As depicted, the example template UI 502 presents the example statement 504 with the partial statement "If a person goes to the store." As illustrated in the example template UI 502, the concept recognizer component 118 may instantiate semantic frames for the word "go" and the user(s) 102 has previously selected a template with a semantic frame for the word "go" that may explain "an agent goes to the destination."

As depicted in the example template UI 502, the user(s) 102 may determine that a generated semantic frame was incorrect and the person is not going to the store as a "destination" but rather as a "source." In response to the user(s) 102 selecting the role to edit, the template interface component 114 may present the example slot relabeling 508 and the example slot label removal 510 to allow the user(s) 102 to remove the incorrect label and relabel the slot with input. In response to the user selecting the example submit icon 506, the template renderer 116 may generate a new template defined with a new semantic frame.

FIG. 6 illustrates example user interfaces (UI) 600 of a device implementing the knowledge acquisition tool with an example statement annotation based on template selection, as discussed herein. In some instances, the example UI 600 may present a UI including an example template UI 602 and 614 to interface with the user(s) 102.

The example template UI 602 may include an example statement 604, an example submit entry icon 606, and example templates 608, 610, and 612. In the present example, as depicted in the example template UI 602, the user(s) 102 has selected a base template with a single blank slot labeled as "situation" for the root-concept to construct a statement and has provided input text, "the driver killed the engine" to complete the statement. In response to receiving input text, the concept recognizer component 118 may perform semantic parsing on the input text to determine a trigger concept is the word "killed." The concept recognizer component 118 may instantiate three new semantic frames for the word "killed." In response, the template renderer 116 may generate three new semantic templates, the example templates 608, 610, and 612, to correspond to each of the three new instantiated semantic frames for the word "killed." The template renderer 116 also generated additional information to present micro-dialogues for each of the example templates 608, 610, and 612 with associated confidence scores. The resulting micro-dialogues is presented in the example template UI 602 to the user(s) 102 with the selectable semantic templates.

In response to the selection of the example template 608, the template renderer 116 may incorporate the semantic template into the statement including the input text by annotating the incomplete statement with the associated semantic frame for the example template 608 as indicated in the example template UI 614.

As depicted in the example template UI 614, the template interface component 114 presents the statement with the input text annotated with the semantic frame. The example template 608 includes two generated slots labeled with "agent" and "machine," and the slot-filler arguments "the driver" and "the engine" is identified from the input text. In response to a user selection of the example submit entry icon 606, the structured representation for the statement is returned.

Figure 7:
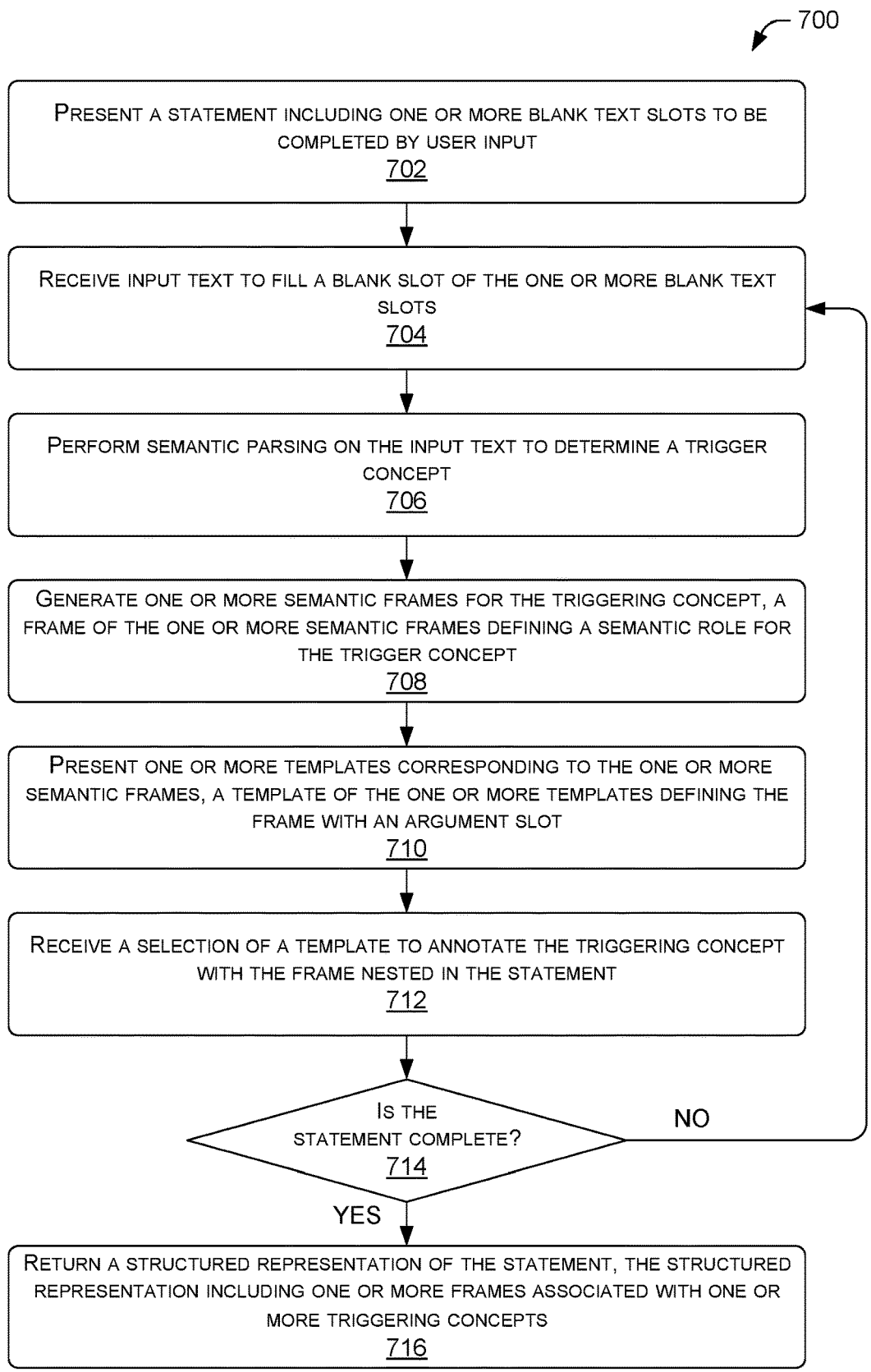
FIG. 7 illustrates an example process for a knowledge acquisition tool iteratively calling a templates generator, as discussed herein.
Figure 8:
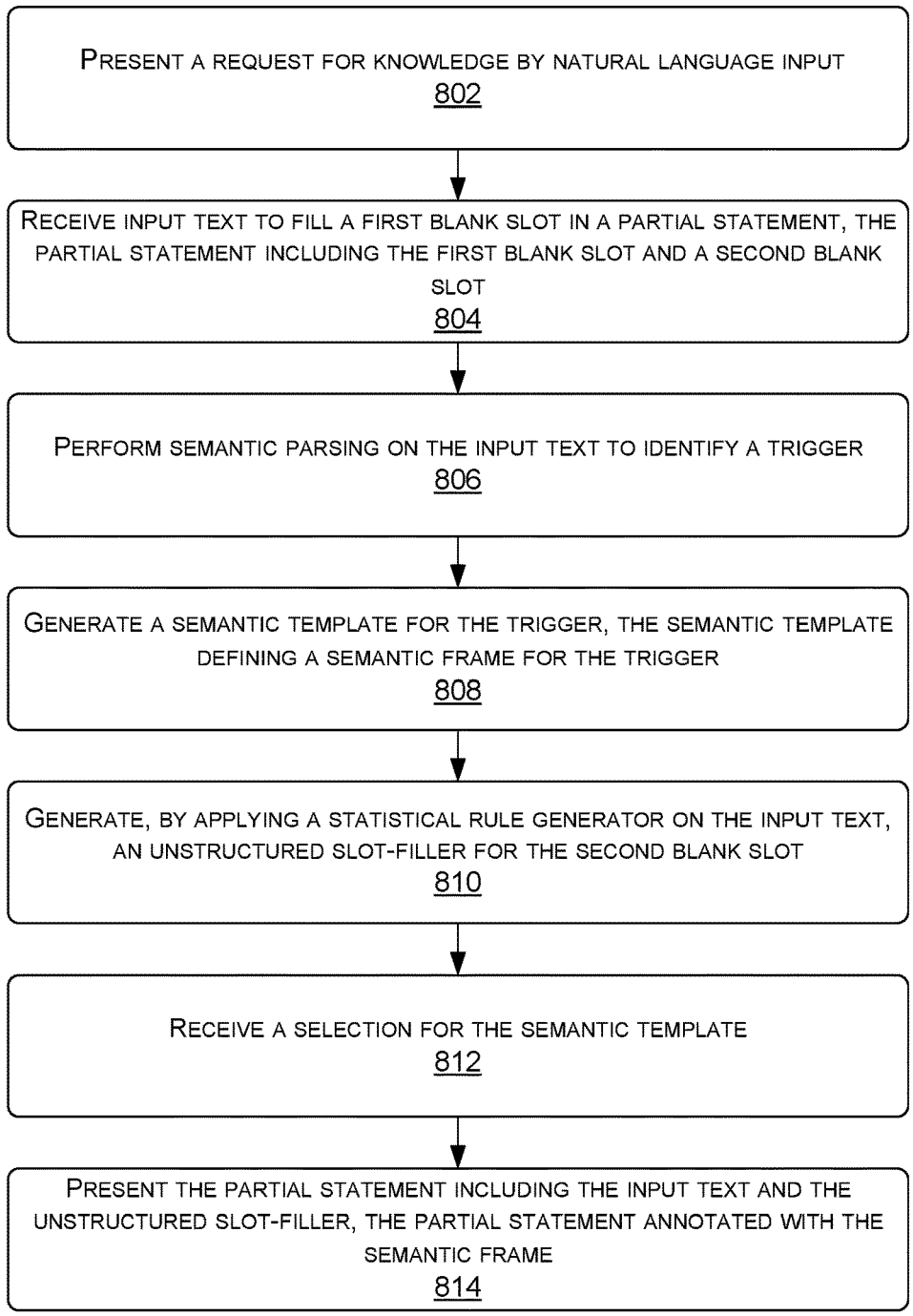
FIG. 8 illustrates an example process for using a knowledge acquisition tool to obtain structured representation, as discussed herein.

FIGS. 7 and 8 are flow diagrams of illustrative processes. The example processes are described in the context of the environment of FIG. 2 but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processors 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 7 is a flow diagram of illustrative process 700 for a knowledge acquisition tool iteratively calling a templates generator, as discussed herein. The process 700 is described with reference to the system 100 and may be performed by one or more of the computing device(s) 108 and/or in cooperation with any one or more of the device(s) 104. Of course, the process 700 (and other processes described herein) may be performed in other similar and/or different environments.

At operation 702, the process may include presenting a statement including one or more blank text slots to be completed by user input. For instance, the computing device(s) 108 or the device(s) 104 may present a statement including one or more blank text slots to be completed by user input. The statement including one or more blank text slots to be completed by user input may be presented to the user(s) 102 via a user interface rendered on the device(s) 104. As described herein, the template interface component 114 may generate a user interface (UI) including UI elements to interact with the user(s) 102 and may present a partial statement with one or more slots labeled with field types to guide input text.

At operation 704, the process may include receiving input text to fill a blank slot of the one or more blank text slots. For instance, the computing device(s) 108 or the device(s) 104 may receive input text to fill a blank slot of the one or more blank text slots. The user(s) 102, via a user interface rendered on the device(s) 104, may select a blank text slot and provide user input. As described herein, the template interface component 114 may visually indicate an input text prompt within a slot to request input text to complete the expression. As input text is received for a slot, the template interface component 114 may display the incoming text in the slot to visually indicate the construction of the statement.

At operation 706, the process may include performing semantic parsing on the input text to determine a trigger concept. For instance, the computing device(s) 108 or the device(s) 104 may perform semantic parsing on the input text to determine a trigger concept. As described herein, the concept recognizer component 118 may determine the trigger concept based on one or more semantic parsers and/or one or more parsing schemes used. In an example, a parsing scheme may include determining a trigger concept based on identifying a predicate in the input text and/or on a preference hierarchy (e.g., verbs first, then adjectives, then nouns, etc.). In various examples, the trigger concept may include any text selected from the input text including a verb, an adverb, a noun, an adjective, and the like. In some examples, the parsing scheme may use syntactic heuristics to determine the trigger concept with the broadest syntactic scope, wherein the broadest syntactic scope is determined relative to the syntactic scope of other words in the input text.

At operation 708, the process may include generating one or more semantic frames for the triggering concept, a frame of the one or more semantic frames defining a semantic role for the trigger concept. For instance, the computing device(s) 108 or the device(s) 104 may generate one or more semantic frames for the triggering concept. As described herein, the concept recognizer component 118 may generate new semantic frame structures for the trigger concept. In some examples, the new frame structures are stored in data structures with an inheritance hierarchy that allows multiple inheritances and includes a definition for a focal role. The concept recognizer component 118 may generate a new semantic frame structure by instantiating a new frame structure and defining the new frame structure for a trigger concept by defining the roles for the trigger concept, providing a parent node, and writing a short definition and/or example.

At operation 710, the process may include presenting one or more templates corresponding to the one or more semantic frames, a template of the one or more templates defining the frame with an argument slot. For instance, the computing device(s) 108 or the device(s) 104 may present one or more templates corresponding to the one or more semantic frames. As described herein, the template interface component 114 may receive updated templates data associated with a trigger concept identified in the input text. The template renderer 116 may use the concept recognizer component 118 to identify a trigger concept from the input text and to instantiate semantic frames for the trigger concept. For each instantiated semantic frame, the template renderer 116 may generate a semantic template defining the semantic frame. In some examples, the template renderer 116 may turn a plain text argument from the input text into a blank slot labeled with the plain text argument as the field type. The template renderer 116 may also generate additional information to present a micro-dialogue with the user(s) 102 and may embed the additional information in templates data to be displayed by the template interface component 114.

At operation 712, the process may include receiving a selection of a template to annotate the triggering concept with the frame nested in the statement. For instance, the computing device(s) 108 or the device(s) 104 may receive a selection of a template to annotate the triggering concept with the frame nested in the statement. As described herein, if a semantic template is selected, the template renderer 116 may incorporate the semantic template into the incomplete statement by annotating the incomplete statement with the associated semantic frame. In some examples, the template renderer 116 may determine to solicit extra information based on the received instantiated semantic frame and may generate the template with additional generated slots labeled with more specific roles. In various examples, to provide additional guidance for input text, the template renderer 116 and/or the concept recognizer component 118 may use a statistical model to auto-complete any generated slots with suggested slot-filler text based on a statistical probability that the user may intend to enter the suggested slot-filler text.

At operation 714, the process may include determining whether the statement complete. For instance, the computing device(s) 108 may determine whether the statement complete. The system may determine whether the one or more blank text slots in the statement have been filled by text. If there are one or more blank text slots remaining in the statement, the process may iteratively return to the operation 704 to receive more input text for blank text slots until all slots are filled. In some examples, the system may use a statistical model to generate suggested slot-fillers. If all text slots in the statement are filled, including any additional generated slots added by selected templates, the statement is complete, and the system may wait for user input to submit the entry. In response to user input to submit the entry, the process may continue to operation 716.

At operation 716, the process may include returning a structured representation of the statement, the structured representation including one or more frames associated with one or more triggering concepts. For instance, the computing device(s) 108 or the device(s) 104 may return a structured representation of the statement by sending the structured representation to a database to store as training data and/or to the semantic converter component 206 to process the structured representation for application use.

FIG. 8 is a flow diagram of illustrative process 800 for using a knowledge acquisition tool to obtain structured representation, as discussed herein. The process 800 is described with reference to the system 100 and may be performed by one or more of the computing device(s) 108 and/or in cooperation with any one or more of the device(s) 104. Of course, the process 800 (and other processes described herein) may be performed in other similar and/or different environments.

At operation 802, the process may include presenting a request for knowledge by natural language input. For instance, the computing device(s) 108 or the device(s) 104 may present a request for knowledge by natural language input. The request for knowledge by natural language input may be presented to the user(s) 102 via a user interface on the device(s) 104.

At operation 804, the process may include receiving input text to fill a first blank slot in a partial statement, the partial statement including the first blank slot and a second blank slot. For instance, the computing device(s) 108 or the device(s) 104 may receive input text to fill a first blank slot in a partial statement. The user(s) 102, via a user interface rendered on the device(s) 104, may select the first blank slot and provide user input. As described herein, the template interface component 114 may visually indicate an input text prompt within the first blank slot to request input text to complete the expression. As input text is received for the first blank slot, the template interface component 114 may display the incoming text in the slot to visually indicate the construction of the statement.

At operation 806, the process may include performing semantic parsing on the input text to identify a trigger. For instance, the computing device(s) 108 or the device(s) 104 may perform semantic parsing on the input text to identify a trigger. As described herein, the concept recognizer component 118 may determine the trigger concept ("trigger") based on one or more semantic parsers and/or one or more parsing schemes used. In an example, a parsing scheme may include determining a trigger concept based on identifying a predicate in the input text and/or on a preference hierarchy (e.g., verbs first, then adjectives, then nouns, etc.). In various examples, the trigger concept may include any text selected from the input text including a verb, an adverb, a noun, an adjective, and the like. In some examples, the parsing scheme may use syntactic heuristics to determine the trigger concept with a broadest syntactic scope, wherein the broadest syntactic scope is determined relative to the syntactic scope of other words in the input text.

At operation 808, the process may include generating a semantic template for the trigger, the semantic template defining a semantic frame for the trigger. For instance, the computing device(s) 108 or the device(s) 104 may generate a semantic template for the trigger. As described herein, the template renderer 116 may use the concept recognizer component 118 to identify a trigger concept from the input text and to instantiate semantic frames for the trigger concept. For each instantiated semantic frame, the template renderer 116 may generate a semantic template defining the semantic frame. In some examples, the template renderer 116 may turn a plain text argument from the input text into a blank slot labeled with the plain text argument as the field type.

At operation 810, the process may include generating, by applying a statistical rule generator on the input text, an unstructured slot-filler for the second blank slot. For instance, the computing device(s) 108 or the device(s) 104 may generate, by applying a statistical rule generator on the input text, an unstructured slot-filler for the second blank slot. As described herein, the concept recognizer component 118 may call the rules predicting component 210 to use a statistical text-plausibility model to generate suggested slot-filler text. The concept recognizer component 118 may use a statistical model to auto-complete any generated slots with suggested slot-filler text based on a statistical probability that the user may intend to enter the suggested slot-filler text.

At operation 812, the process may include receiving a selection for the semantic template. For instance, the computing device(s) 108 or the device(s) 104 may receive a selection for the semantic template. As described herein, the template interface component 114 may receive a selection for a semantic template and may incorporate the semantic template into the partial statement by nesting the semantic frame within the semantic frame structure for the partial statement.

At operation 814, the process may include presenting the partial statement including the input text and the unstructured slot-filler, the partial statement annotated with the semantic frame. For instance, the computing device(s) 108 or the device(s) 104 may present the partial statement including the input text and the unstructured slot-filler, the partial statement annotated with the semantic frame. As described herein, if a semantic template is selected, the template renderer 116 may incorporate the semantic template into the incomplete statement by annotating the incomplete statement with the associated semantic frame.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
    presenting, via a user interface, a partial statement including one or more blank text slots to be completed by user input;
    receiving input text to fill a slot of the one or more blank text slots;
    performing semantic parsing on the input text to determine a trigger concept;
    generating one or more semantic frames for the trigger concept, a semantic frame of the one or more semantic frames defining a semantic role and a semantic argument for the trigger concept;
    presenting, via the user interface, one or more templates corresponding to the one or more semantic frames, a template of the one or more templates defining the semantic frame including a generated slot labeled by the semantic argument;
    receiving, via the user interface, a user selection for the template;
    annotating, based at least in part on the user selection for the template, the trigger concept with the semantic frame nested in the partial statement, wherein the annotating includes:
        determining, based at least in part on applying a machine learning (ML) model to the input text, a suggested slot-filler for an unfilled slot of the one or more blank text slots;
        determining an argument slot-filler from the input text to fill the generated slot; and
        presenting, via the user interface, the partial statement including the input text, the partial statement including the trigger concept annotated with the semantic frame and the argument slot-filler indicated by the generated slot and labeled with by the semantic argument;
    determining, based at least in part on the user input to submit the partial statement, the partial statement is complete to generate a complete statement expression;
    returning a structured representation of the complete statement expression, the structured representation including the semantic frame for the trigger concept; and
    using the structured representation as training data for retraining the ML model.

2. The computer-implemented method as recited in claim 1, wherein returning the structured representation includes mapping the structured representation and unstructured text of the complete statement expression.

3. The computer-implemented method as recited in claim 1, wherein determining the partial statement is complete further comprises:
    repeating processes iteratively to receive input text to generate semantic templates and to fill the one or more blank text slots with text; and
    determining, based at least in part on filling the one or more blank text slots with text, the completed statement from the partial statement including the one or more blank text slots with text.

4. The computer-implemented method as recited in claim 1, further comprising:
    storing the structured representation of the completed statement expression for the training data.

5. A system comprising:
    one or more processors; and
    one or more computer-readable media storing instructions that, when executed by the one or more processors, cause the one or more processors to perform operations comprising:
        presenting a partial statement including one or more text slots to be completed by user input;
        receiving input text to fill a slot of the one or more text slots;
        performing semantic parsing on the input text to determine a trigger concept;
        generating a semantic frame for the trigger concept, the semantic frame defining a semantic role and a semantic argument for the trigger concept;
        generating a semantic template corresponding to the semantic frame, the semantic template defining the semantic frame including a generated slot labeled with the semantic argument;
        receiving a user selection for the semantic template;
        annotating, based at least in part on the user selection for the semantic template, the trigger concept with the semantic frame nested in the partial statement, wherein annotating the trigger concept includes:

determining, based at least in part on applying a machine learning (ML) model to the input text, a suggested slot-filler for an unfilled slot of the one or more text slots;

presenting the partial statement including the input text and the trigger concept annotated by the semantic frame;

determining, based at least in part on the user input to submit the partial statement, the partial statement is complete to generate a completed statement;

returning a structured representation of the completed statement, the structured representation including the semantic frame for the trigger concept; and using the structured representation as training data for retraining the ML model.

6. The system as recited in claim 5, wherein determining the partial statement is complete further comprises:

repeating processes iteratively to receive input text to generate semantic templates and to fill the one or more text slots with text; and determining, based at least in part on filling the one or more text slots with text, the completed statement from the partial statement including the one or more text slots with text.

7. The system as recited in claim 6, the operations further comprising:

receiving the user input including a request to submit the completed statement; and returning a structured representation of the completed statement, the structured representation including the semantic frame for the trigger concept.

8. The system as recited in claim 7, wherein returning the structured representation of the completed statement includes mapping the structured representation and unstructured text.

9. The system as recited in claim 8, the operations further comprising:

storing the structured representation of the completed statement as training data.

10. The system as recited in claim 9, the operations further comprising:

training, based at least in part on the training data, a new model to be used by a semantic frames generator to generate new semantic frames.

11. The system as recited in claim 7, wherein returning the structured representation includes applying a domain specific logic to convert the structured representation to usable data for a downstream application.

12. The system as recited in claim 5, wherein the trigger concept is determined based at least in part on a predicate identified in the input text and a hierarchy scheme.

13. The system as recited in claim 12, wherein the trigger concept is further determined based at least in part on identifying a predicate with a broadest syntactic scope, wherein the broadest syntactic scope is determined relative to syntactic scopes associated with other words in the input text, and wherein the trigger concept includes one of a verb, adjective, noun, or adverb identified in the input text.

14. The system as recited in claim 5, wherein generating the semantic frame includes applying one or more semantic parsers on the partial statement including the input text to determine a frames sense for the trigger concept.

15. The system as recited in claim 5, the operations further comprising:

receiving a request to edit the generated slot labeled with the semantic argument;

receiving new user input to change a label for the generated slot with a new argument; and generating a new semantic frame for the trigger concept, the new semantic frame defining the semantic role and a new argument for the trigger concept.

16. A computer-implemented method comprising:

presenting a request for knowledge by natural language input;

receiving input text to fill a first blank slot in a partial statement, the partial statement including the first blank slot and a second blank slot;

performing semantic parsing on the input text to identify a trigger;

generating a semantic template for the trigger, the semantic template defining a semantic frame for the trigger;

generating, by applying a machine learning (ML) model to the input text to generate completion text, an unstructured slot-filler for the second blank slot;

receiving a selection for the semantic template;

presenting the partial statement including the input text and the unstructured slot-filler, the partial statement annotated with the semantic frame;

receiving a request to submit the partial statement;

returning a structured representation of the partial statement including the input text and the unstructured slot-filler, the structured representation including the semantic frame for the trigger; and using the structured representation as training data for retraining the ML model.

17. The computer-implemented method as recited in claim 16, further comprising:

receiving second input text to fill the second blank slot; and performing semantic parsing on the second input text to identify a second trigger.

18. The computer-implemented method as recited in claim 17, further comprising:

generating one or more semantic frames for the second trigger, the one or more semantic frames including a first semantic frame defining a first role for the second trigger and a second semantic frame defining a second role for the second trigger; and generating one or more semantic templates corresponding to the one or more semantic frames, the one or more semantic templates including a first template corresponding to the first semantic frame and a second template corresponding to the second semantic frame.

19. The computer-implemented method as recited in claim 18, further comprising:

receiving a selection of the second template; and presenting the partial statement including the input text and the second input text, the partial statement annotated with the semantic frame and the second semantic frame.

20. The computer-implemented method as recited in claim 16, wherein returning the structured representation of the partial statement includes mapping the structured representation and unstructured text.

* * * * *